(12) United States Patent
Spadacini et al.

(10) Patent No.: US 11,952,921 B2
(45) Date of Patent: Apr. 9, 2024

(54) PLANT AND PROCESS FOR ENERGY STORAGE AND METHOD FOR CONTROLLING A HEAT CARRIER IN A PROCESS FOR ENERGY STORAGE

(71) Applicant: ENERGY DOME S.p.A., Milan (IT)

(72) Inventors: Claudio Spadacini, Verbania Suna (IT); Dario Rizzi, Milan (IT)

(73) Assignee: ENERGY DOME S.p.A., Milan (IT)

( * ) Notice: Subject to any disclaimer, the term of this patent is extended or adjusted under 35 U.S.C. 154(b) by 0 days.

(21) Appl. No.: 18/251,822

(22) PCT Filed: Oct. 27, 2021

(86) PCT No.: PCT/IB2021/059917
§ 371 (c)(1),
(2) Date: May 4, 2023

(87) PCT Pub. No.: WO2022/101727
PCT Pub. Date: May 19, 2022

(65) Prior Publication Data
US 2023/0417160 A1    Dec. 28, 2023

(30) Foreign Application Priority Data

Nov. 5, 2020   (IT) .................. 102020000026452

(51) Int. Cl.
*F01K 25/10* (2006.01)
*F01K 3/00* (2006.01)
(Continued)

(52) U.S. Cl.
CPC ............ *F01K 25/103* (2013.01); *F01K 3/006* (2013.01); *F01K 3/02* (2013.01); *F01K 3/18* (2013.01); *F01K 9/00* (2013.01); *F02C 6/14* (2013.01)

(58) Field of Classification Search
CPC .......... F01K 3/006; F01K 3/18; F01K 25/103; F02C 6/14
See application file for complete search history.

(56) References Cited

U.S. PATENT DOCUMENTS

2018/0340712 A1    11/2018  Peter et al.

FOREIGN PATENT DOCUMENTS

CN          107035447 A   *   8/2017
CN          109441741 A   *   3/2019  ............. F01D 15/10
(Continued)

OTHER PUBLICATIONS

International Search Report & Written Opinion dated Feb. 16, 2022 in PCT/IB2021/059917 filed on Oct. 27, 2021, 10 pages.

*Primary Examiner* — Jonathan R Matthias
(74) *Attorney, Agent, or Firm* — Oblon, McClelland, Maier & Neustadt, L.L.P.

(57) ABSTRACT

A process for energy storage comprises carrying out a cyclic thermodynamic transformation wherein, in a charge phase, a condensation of a working fluid is executed by means of heat absorption by a heat carrier in order to store the working fluid in the liquid or supercritical phase; in a discharge phase, an evaporation of the working fluid is executed starting from the liquid or supercritical phase and by transfer of heat from the heat carrier; provision is made for actively adjusting at least one parameter of the working fluid related to the condensation and/or to the evaporation, in order to control at least one temperature of the heat carrier and uncouple it from the ambient temperature without the aid of systems outside the cyclic thermodynamic transformation.

16 Claims, 8 Drawing Sheets

(51) Int. Cl.
*F01K 3/02* (2006.01)
*F01K 3/18* (2006.01)
*F01K 9/00* (2006.01)
*F02C 6/14* (2006.01)

(56) References Cited

FOREIGN PATENT DOCUMENTS

| CN | 110374838 A | * | 10/2019 | ............. | F01D 15/10 |
|---|---|---|---|---|---|
| CN | 110715541 A | * | 1/2020 | | |
| DE | 10 2017 003 238 A1 | | 10/2018 | | |
| GB | 2484080 A | * | 4/2012 | ........... | F01K 25/103 |
| GB | 2537126 A | | 10/2016 | | |
| IT | 102019000002385 A1 | | 8/2020 | | |
| RU | 2 435 041 C2 | | 11/2011 | | |

* cited by examiner

FIG.11
FIG.12
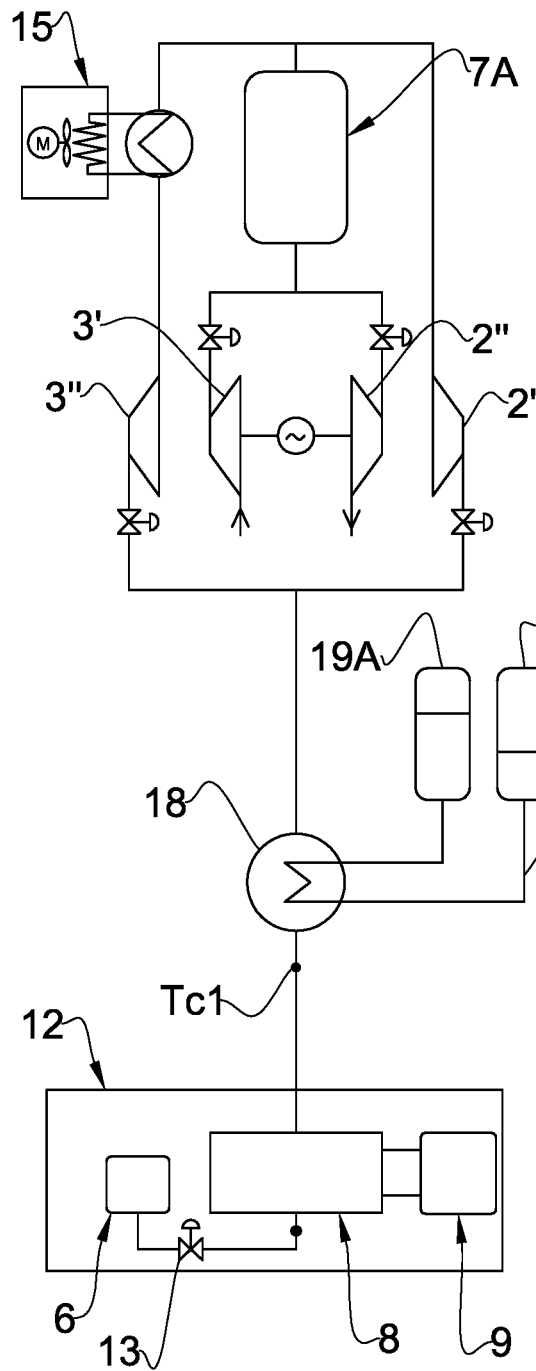
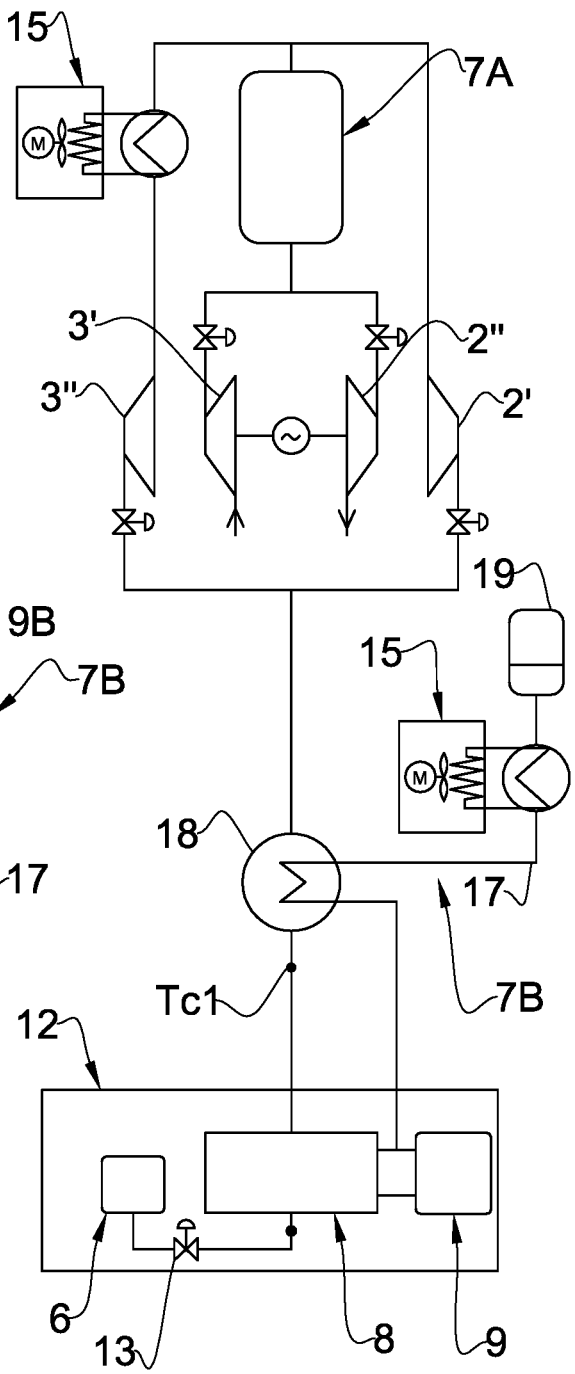

PLANT AND PROCESS FOR ENERGY STORAGE AND METHOD FOR CONTROLLING A HEAT CARRIER IN A PROCESS FOR ENERGY STORAGE

FIELD OF THE FINDING

The object of the present invention is a plant and a process for energy storage. More precisely, the object of the present invention is a system capable of absorbing/using mechanical/electrical energy from a grid and/or from a system, for example in the periods when there is excess availability/or scarce consumption, capable of maintaining the stored energy over time and capable of transforming it into mechanical/electrical energy and reintroducing it into the network and/or into the system at the times of request of said mechanical/electrical energy. In particular, the present invention refers to a method for controlling a heat carrier in a plant and/or in a process for energy storage.

BACKGROUND OF THE FINDING

One such type of system is for example illustrated in the public document WO 2020/039416, on behalf of the same Applicant, which illustrates a process and plant for energy storage. The plant of WO 2020/039416 comprises a casing for the storage of a working fluid different from atmospheric air, in gaseous phase and in pressure equilibrium with the atmosphere; a tank for the storage of such working fluid in liquid or supercritical phase with a temperature close to the critical temperature, wherein the critical temperature is close to the ambient temperature. The plant is configured for carrying out a closed cyclic thermodynamic transformation, first in one direction in a charge configuration and then in an opposite direction in a discharge configuration, between the casing and the tank. In the charge configuration the plant accumulates heat and pressure and in the discharge configuration generates energy.

DEFINITIONS

In the present description and in the enclosed claims, reference will be made to the following definitions.
  Thermodynamic cycle (TC): thermodynamic transformation from a point X to a point Y, where X coincides with Y; the TC unlike the CTT (Cyclic thermodynamic transformation) mentioned below does not have mass accumulations (significant for energy purposes) within the cycle, while the CTT typically works between two working fluid storages, one initial and the other final;
  Cyclic thermodynamic transformation (CTT): thermodynamic transformation from a point X to a point Y and from a point Y to a point X, without necessarily passing from the same intermediate points;
  Closed TC and/or CTT: without mass exchange (significant for energy purposes) with the atmosphere;
  Open TC and/or CTT: with mass exchange (significant for energy purposes) with the atmosphere.

SUMMARY

For systems of the type described in WO 2020/039416, the Applicant has observed that, due to the performances of the machines of the plant which operate the cyclic thermodynamic transformation (CTT) and the "thermal" performances of the cycle, heat to be disposed of in the environment is always present. For example, by assuming a Round Trip Efficiency (RTE) of 80%, 20% must be dissipated into the environment.

The need to be able to exchange heat with the environment arises from the ability to decide the temperature level (and hence pressure level) of the storage phase of the cyclic thermodynamic transformation (CTT), i.e. at which temperature and hence pressure to accumulate the mass of the working fluid in liquid conditions. Relatively low pressures are preferable, for example, for the sizing of the system, since they allow limiting the thicknesses of the tanks, of the piping, etc. and simplifying the machines, and this translates into a considerable reduction of the plant attainment costs.

The Applicant has observed that part of the heat to be dissipated can be easily disposed of since it is generated at average temperatures, for example mechanical and electrical losses, which are transferred into the lubrication oil or into the cooling air and which are easily disposed of in the environment since their temperature is typically higher than the ambient temperature.

The Applicant has also observed that part of the above-described heat to be disposed of is instead close to ambient temperature and is more difficult to dispose of. Indeed, in a CTT system, the heat can exit at a specific point of the process if it has a temperature greater than the ambient temperature/source temperature, while if it doesn't have a temperature greater than the ambient temperature/source temperature it can enter.

In order to allow an exchange of heat with the environment, at the inlet or outlet, independent of the ambient temperature, i.e. in order to uncouple the operation of the CTT system from the ambient temperature, it is known, through devices that are external with respect to the cyclic thermodynamic transformation (CTT) such as heat pumps or chillers, to create an artificial source at a temperature higher or lower than the ambient temperature. Such known solution type is for example illustrated in WO 2020/039416 which, in FIG. 9, shows that the secondary circuit thereof traversed by the secondary fluid or heat carrier (useful for the condensation and for the evaporation) is operatively connected to an auxiliary refrigerator.

The Applicant has however observed that the use of devices that are external with respect to the CTT, such as the additional heat pump, renders the plant more complex and hence more costly and less reliable.

The Applicant has also observed that the use of external devices causes a reduction of the overall performance of the system.

The Applicant has therefore set the objective of being able to freely select/set the condensation and/or evaporation pressure of the working fluid used in the cyclic thermodynamic transformation (CTT), by uncoupling the temperature of the heat carrier, useful for the condensation and the evaporation, from the ambient temperature, without the aid of systems/devices outside the cyclic thermodynamic transformation (CTT) itself.

In particular, the Applicant has found that it is possible to control a temperature of the heat carrier and to uncouple said temperature of the heat carrier from an ambient temperature through the active adjustment of parameters of the working fluid.

In particular, the above-indicated objectives and still others are substantially reached by a plant and by a process for energy storage of the type claimed in the enclosed claims and/or described in the following aspects.

In an independent aspect, the present invention refers to a process for energy storage comprising:

carrying out a closed cyclic thermodynamic transformation, first in one direction in a charge configuration/phase and then in an opposite direction in a discharge configuration/phase, between a casing for the storage of a working fluid different from atmospheric air, in gaseous phase and in pressure equilibrium with the atmosphere, and a tank for the storage of said working fluid in liquid or supercritical phase; wherein in the charge phase the process accumulates heat and potential energy in the form of pressure and in the discharge phase generates energy;

wherein in the charge phase, a condensation of the working fluid is performed by means of heat absorption by a heat carrier (and transfer of heat from the working fluid), executed in a condenser/evaporator which works as cooler/condenser, in order to store said working fluid in the liquid or supercritical phase;

wherein in the discharge phase, an evaporation of the working fluid is performed, executed in said condenser/evaporator which works as heater/evaporator, starting from the liquid or supercritical phase and by transfer of heat from the heat carrier (and heat absorption by the working fluid);

wherein provision is made for actively adjusting at least one working fluid parameter related to the condensation and/or to the evaporation, in order to control at least one temperature of the heat carrier and to uncouple said at least one temperature of the heat carrier from an ambient temperature;

wherein said at least one actively adjusted parameter of the working fluid is selected from the group comprising:
  a condenser inlet temperature, i.e. at an entrance into the condenser/evaporator in the charge phase; and/or
  a condensation start temperature; and/or
  a condensation end temperature; and/or
  a condenser outlet temperature, i.e. at an exit from the condenser/evaporator in the charge phase; and/or
  an evaporator inlet temperature, i.e. at the entrance into the condenser/evaporator in the discharge phase; and/or
  an evaporation start temperature; and/or
  an evaporation end temperature; and/or
  an evaporator outlet temperature, i.e. at the exit from the condenser/evaporator in the discharge phase.

In an independent aspect, the present invention refers to a plant for energy storage, comprising:
  a working fluid different from atmospheric air;
  at least one casing configured for storing the working fluid in gaseous phase and in pressure equilibrium with the atmosphere;
  at least one tank configured for storing said working fluid in liquid or supercritical phase;
  pipes operatively interposed between the casing and the tank and connecting, directly and/or indirectly, the casing with the tank; wherein the pipes delimit:
    at least one charge path extended from the casing to the tank,
    at least one discharge path extended from the tank to the casing;
  at least one expander, optionally an expansion turbine, arranged along the pipes and configured to expand the working fluid;
  at least one compressor, optionally a turbocharger, arranged along the pipes and configured to compress the working fluid;
  at least one condenser/evaporator arranged along the pipes, operatively coupled to the tank and comprising a heat carrier configured to transfer heat to the working fluid or to absorb heat from the working fluid;

wherein the plant is configured for carrying out a closed cyclic thermodynamic transformation with the working fluid, first in one direction in a charge configuration and then in an opposite direction in a discharge configuration, between said casing and said tank;

wherein, in the charge configuration, the plant is configured to condense the working fluid by means of heat absorption by the heat carrier (and transfer of heat from the working fluid), executed in the condenser/evaporator which works as cooler/condenser, and storing said working fluid in the liquid or supercritical phase;

wherein, in the discharge configuration, the plant is configured to evaporate the working fluid starting from the liquid or supercritical phase by transfer of heat from the heat carrier (and heat absorption by the working fluid), executed in said condenser/evaporator which works as heater/evaporator;

wherein the plant also comprises adjusting devices and a control unit operatively coupled to the adjusting devices; the control unit being configured and/or programmed for actively adjusting at least one parameter of the working fluid related to the condensation and/or to the evaporation through said adjusting devices, in order to control at least one temperature of the heat carrier and to uncouple said at least one temperature of the heat carrier from an ambient temperature;

wherein said at least one actively adjusted parameter of the working fluid is selected from the group comprising:
  a condenser inlet temperature, i.e. at an entrance into the condenser/evaporator in the charge configuration; and/or
  a condensation start temperature; and/or
  a condensation end temperature; and/or
  a condenser outlet temperature, i.e. at an exit from the condenser/evaporator in the charge configuration; and/or
  an evaporator inlet temperature, i.e. at the entrance into the condenser/evaporator in the discharge configuration; and/or
  an evaporation start temperature; and/or
  an evaporation end temperature; and/or
  an evaporator outlet temperature, i.e. at the exit from the condenser/evaporator in the discharge configuration.

In one aspect, the process described and/or claimed herein is actuated through the plant described and/or claimed herein or the plant described and/or claimed herein is configured for carrying out the process described and/or claimed herein.

In one aspect, the present invention refers to a method for controlling a heat carrier in a process and/or in a plant for energy storage, wherein the process and/or the plant are described in the preceding aspects.

The method comprises:
  actively adjusting at least one parameter of the working fluid related to the condensation and/or to the evaporation, in order to control at least one temperature of the heat carrier and to uncouple said at least one temperature of the heat carrier from an ambient temperature;
  wherein said at least one actively adjusted parameter of the working fluid is selected from the group comprising:

a condenser inlet temperature, i.e. at an entrance into the condenser/evaporator in the charge configuration/phase; and/or a condensation start temperature; and/or a condensation end temperature; and/or a condenser outlet temperature, i.e. at an exit from the condenser/evaporator in the charge configuration/phase; and/or an evaporator inlet temperature, i.e. at the entrance into the condenser/evaporator in the discharge configuration/phase; and/or an evaporation start temperature; and/or an evaporation end temperature; and/or an evaporator outlet temperature, i.e. at the exit from the condenser/evaporator in the discharge configuration/phase.

With "condensation start temperature" it is intended that temperature of the working fluid at which the working fluid phase transition from the gaseous phase to the liquid phase starts.

With "condensation end temperature" it is intended that temperature of the working fluid at which the working fluid phase transition from the gaseous phase to the liquid phase terminates.

Such start and end condensation temperatures are reached by the working fluid within the condenser/evaporator in the charge configuration/phase.

With "evaporation start temperature" it is intended that temperature of the working fluid at which the working fluid phase transition from the liquid phase to the gaseous phase starts.

With "evaporation end temperature" it is intended that temperature of the working fluid at which the working fluid phase transition from the liquid phase to the gaseous phase terminates.

Such start and end evaporation temperatures are reached by the working fluid within the condenser/evaporator in the discharge configuration/phase.

The Applicant has verified that the active adjustment of at least one of the parameters of the working fluid allows carrying out the cyclic thermodynamic transformation (CTT) independent of the ambient temperature and without the aid of devices outside the cyclic thermodynamic transformation (CTT) adapted to create artificial sources at a temperature higher or lower than the ambient temperature.

The Applicant has verified that the active adjustment of one or more parameters of the working fluid allows uncoupling the process/plant CTT from the ambient temperature, simultaneously maintaining the plant relatively simple, with consequent benefits regarding the costs of attainment and on the reliability thereof.

Further aspects of the invention are illustrated hereinbelow.

In one aspect, the condenser/evaporator with the heat carrier and the tank are part of a system that is "nearly adiabatic" with respect to the environment, indeed it can be defined adiabatic except for minimum heat exchanges, e.g. thermal losses, which can be minimized through insulation and insulating materials. The nearly adiabatic system comprises said condenser/evaporator, an energy storage through the heat carrier (or condensation means), in the form of heat necessary for storing the latent and sensible heat of condensation and evaporation, and the tank in which the condensed pressurized working fluid is accumulated.

In one aspect, a basin contains the heat carrier; wherein the basin is part of the system that is "nearly adiabatic" with the environment.

In one aspect, the condenser/evaporator comprises a single exchanger or a single plurality of exchangers in series or in parallel, capable of operating both as condenser and as evaporator.

In one aspect, the condenser/evaporator comprises a condensation exchanger (or a single plurality of condensation exchangers in series or in parallel) and a different evaporation exchanger (or a single plurality of evaporation exchangers in series or in parallel).

In one aspect, provision is made for adjusting multiple parameters of the working fluid.

In one aspect, the working fluid is carbon dioxide.

In one aspect, the working fluid is selected in the group comprising: $CO_2$, $SF_6$, $N_2O$, or a mixture thereof, or even a mixture of the same with other components which act as additives, for example mainly for modifying the critical temperature parameters of the resulting mixture, so as to optimize the performances of the system.

In one aspect, the heat carrier is water and/or mainly water-based mixtures.

In one aspect, the charge phase comprises a desuperheating of the working fluid, following the condensation of the working fluid, followed by a supercooling of the working fluid.

In one aspect, the condenser inlet temperature is the temperature at the start of the desuperheating; the condensation start temperature is the temperature at the end of the desuperheating and at the start of the actual condensation; the condensation end temperature is the temperature at the end of the actual condensation and at the start of the supercooling; the condenser outlet temperature is the temperature at the end of the supercooling.

In one aspect, said at least one actively adjusted parameter of the working fluid is an evaporation pressure; the adjustment of said evaporation pressure affecting the evaporator inlet temperature and/or the evaporation start temperature and/or the evaporation end temperature.

In one aspect, the discharge phase comprises a possible heating and/or throttling of the working fluid, followed by the evaporation of the working fluid, followed by a superheating of the working fluid.

In one aspect, the evaporator inlet temperature is the temperature at the start of the heating and/or throttling; the evaporation start temperature is the temperature at the end of the heating and/or throttling and at the start of the actual evaporation; the evaporation end temperature is the temperature at the end of the actual evaporation and at the start of the superheating; the evaporator outlet temperature is the temperature at the end of the superheating.

In one aspect, the evaporator inlet temperature and the evaporation start temperature coincide.

In one aspect, the heat carrier has: a first heat absorption start temperature; a second heat absorption end temperature; a third heat transfer start temperature; a fourth heat transfer end temperature.

In one aspect, when the working fluid is at the condenser inlet temperature, the heat carrier has the first heat absorption start temperature.

In one aspect, when the working fluid is at the condenser outlet temperature, the heat carrier has the second heat absorption end temperature.

In one aspect, when the working fluid is at the evaporator inlet temperature, the heat carrier has the third heat transfer start temperature.

In one aspect, when the working fluid is at the evaporator outlet temperature, the heat carrier has the fourth end heat transfer temperature.

In one aspect, if the heat carrier is the same for both phases (charge and discharge) and it is preserved within a system which does not significantly dissipate heat, the second heat absorption end temperature and the third heat transfer start temperature coincide.

In one aspect, said at least one temperature of the heat carrier to be controlled comprises the first temperature and/or the fourth temperature of the heat carrier.

In one aspect, provision is made for controlling the first temperature and/or the fourth temperature of the heat carrier in a manner such that the fourth temperature is higher than the first temperature, in order to have an excess of heat during condensation with respect to evaporation, in a manner such that the heat carrier can transfer heat to the environment while the working fluid is stored. This control is carried out if the plant is situated in a very cold environment. In this manner the heat carrier can transfer heat to the environment during the static accumulation period, in order to be brought back from the fourth temperature to the first temperature.

In one aspect, provision is made for controlling the first temperature and/or the fourth temperature of the heat carrier in a manner such that the first temperature is higher than the fourth temperature, in order to have an excess of heat during evaporation with respect to condensation, in a manner such that the heat carrier can absorb heat from the environment while the working fluid is stored. This control is carried out if the plant is situated in a very hot environment. In this manner the heat carrier can absorb heat from the environment during the static accumulation period, in order to be brought back from the fourth temperature to the first temperature.

In one aspect, controlling the first temperature of the heat carrier in order to have said excess of heat during condensation with respect to evaporation comprises, during condensation, increasing the condenser inlet temperature or increasing a difference between the condenser inlet temperature and the condensation start temperature; and/or decreasing the condenser outlet temperature or increasing a difference between the condensation end temperature and the condenser outlet temperature.

In one aspect, controlling the first temperature of the heat carrier in order to have said excess of heat during condensation with respect to evaporation comprises: during evaporation, increasing the evaporation pressure and hence the evaporator inlet temperature and/or the evaporation start temperature and/or the evaporation end temperature; and/or decreasing a difference between the evaporation end temperature and the evaporator outlet temperature.

In one aspect, controlling the first temperature of the heat carrier in order to have said excess of heat during evaporation with respect to condensation comprises: during condensation, decreasing the condenser inlet temperature or decreasing a difference between the condenser inlet temperature and the condensation start temperature; and/or increasing the condenser outlet temperature or decreasing a difference between the condensation end temperature and the condenser outlet temperature.

In one aspect, controlling the first temperature of the heat carrier in order to have said excess of heat during evaporation with respect to condensation comprises: during evaporation, decreasing the evaporation pressure and hence the evaporator inlet temperature and/or the evaporation start temperature and/or the evaporation end temperature; and/or increasing a difference between the evaporation end temperature and the evaporator outlet temperature.

In one aspect, the adjusting devices comprise: a flow control valve operatively arranged between the tank and the condenser/evaporator and configured to adjust an evaporation pressure of the working fluid and hence an evaporator inlet temperature and/or an evaporation start temperature and/or an evaporation end temperature.

In one aspect, the adjusting devices comprise: a control valve placed at the inlet expander and configured to adjust the evaporation pressure of the working fluid and hence the evaporator inlet temperature and/or the evaporation start temperature and/or the evaporation end temperature.

In one aspect, the adjusting devices comprise: at least one heat exchanger configured for exchanging heat with the environment and directly or indirectly coupled to the pipes of the working fluid, placed upstream of the condenser/evaporator and downstream of the compressor along the charge path; wherein said at least one heat exchanger configured for exchanging heat with the environment is configured to adjust the condenser inlet temperature.

In one aspect, a temperature of the working fluid in the charge configuration/phase downstream of the compressor and upstream of the condenser/evaporator is higher than an ambient temperature.

In one aspect, in the charge configuration/phase, a delivery temperature of the compressor is lower than 450° C., optionally lower than 375° C.

In one aspect, a thermal accumulator (Thermal Energy Storage or TES) is operatively coupled to the pipes and is arranged between the expander and the condenser/evaporator.

In one aspect, the thermal accumulator is a "pressurized packed bed" (PPB).

In one aspect, the thermal accumulator is of the type with liquid, optionally water.

In one aspect, the thermal accumulator comprises a plurality of thermal accumulators and/or is divided into a plurality of parts.

In one aspect, at least one of the thermal accumulators of said plurality or at least one of the parts is a "pressurized packed bed" (PPB) and at least one of the thermal accumulators of said plurality or at least one of the parts is of liquid type.

In one aspect, at least one of the thermal accumulators of said plurality or at least one of the parts is operatively situated between two compressors or two compression stages and/or between two expanders or two expansion stages.

In one aspect, the adjusting devices are operatively coupled to the thermal accumulator or they are operatively active between the thermal accumulator and the condenser/evaporator.

In one aspect, the thermal accumulator comprises a thermal fluid and an auxiliary exchanger, wherein the auxiliary exchanger is operatively coupled to the pipes and is placed upstream of the condenser/evaporator along the charge path.

In one aspect, the heat exchanger configured for exchanging heat with the environment is operatively coupled to the thermal accumulator. The thermal accumulator is therefore capable of transferring to the environment or receiving heat from the environment.

In one aspect, the thermal accumulator comprises: a first tank, a second tank connected together and to the auxiliary exchanger and containing the thermal fluid, a first heat exchanger configured for exchanging heat with the environment and situated between the first tank and the auxiliary exchanger, a second heat exchanger configured for exchanging heat with the environment and situated between the second tank and the auxiliary exchanger.

In one aspect, the thermal accumulator comprises a tank for the thermal fluid in fluid communication with the auxiliary exchanger and with the basin of the heat carrier, a first heat exchanger configured for exchanging heat with the environment and situated between the tank and the auxiliary exchanger, a second heat exchanger configured for exchanging heat with the environment and situated between the auxiliary exchanger and the basin.

In one aspect, the thermal fluid is the same heat carrier.

In one aspect, at least one of the thermal accumulators of said plurality or at least one of the parts is in fluid connection with the basin in order to use a part of the heat carrier.

In one aspect, the adjusting devices comprise: a flow rate and/or level regulator of the heat carrier and/or of the working fluid, wherein the flow rate and/or level regulator is operatively active in the condenser/evaporator when it works as condenser, wherein the flow rate and/or level regulator is configured to adjust said flow rate and/or said level of the heat carrier and/or of the working fluid and hence the condenser outlet temperature.

In one aspect, the condenser/evaporator comprises a supercooling exchanger dedicated to cooling the working fluid from the condensation end temperature to the condenser outlet temperature (supercooling); wherein the condenser outlet temperature is adjusted by adjusting a flow rate of the heat carrier in the supercooling exchanger.

In one aspect, the condenser/evaporator is of the type with tube bundle and shell (shell & tube).

In one aspect, the heat carrier is contained in the tubes of the tube bundle and the working fluid is contained in the shell; wherein the condenser outlet temperature is adjusted by adjusting a level of the working fluid in the shell (and/or by selecting how many tubes and thus how much surface of the exchanger to be dedicated to supercooling).

In one aspect, the working fluid is contained in the tubes of the tube bundle and the heat carrier is contained in the shell; wherein the condenser outlet temperature is adjusted by adjusting a flow rate of the heat carrier in the tubes (i.e. by increasing the heat exchange and hence the capacity to remove heat from the working fluid).

In one aspect, the adjusting devices comprise: a flow rate and/or level regulator of the heat carrier and/or of the working fluid operatively active in the condenser/evaporator when it works as evaporator, wherein the flow rate and/or level regulator is configured to adjust said flow rate and/or said level of the heat carrier and/or of the working fluid and hence the evaporator outlet temperature.

In one aspect, the condenser/evaporator comprises a superheating exchanger dedicated to superheating the working fluid from the evaporation end temperature to the evaporator outlet temperature (superheating); wherein the evaporator outlet temperature is adjusted by adjusting a flow rate of the heat carrier in the superheating exchanger.

In one aspect, the heat carrier is contained in the tubes of the tube bundle and the working fluid is contained in the shell; wherein the evaporator outlet temperature is adjusted by adjusting a level of the working fluid in the shell (and/or by selecting how many tubes and hence how much surface of the exchanger to be dedicated to superheating).

In one aspect, the working fluid is contained in the tubes of the tube bundle and the heat carrier is contained in the shell; wherein the evaporator outlet temperature is adjusted by adjusting a flow rate of the heat carrier in the tubes (i.e. by increasing the heat exchange and hence the capacity to transfer heat to the working fluid).

In one aspect, the compressor is mechanically connected to a motor or to a motor-generator or to another generator of mechanical energy exploited by the compressor.

In one aspect, the compressor comprises a plurality of compressors in series or in parallel with or without intermediate cooling.

In one aspect, the expander is mechanically connected to a generator or to a motor-generator or to another machine capable of exploiting the mechanical energy produced by the expander.

In one aspect, the expander comprises a plurality of expanders in series or in parallel with or without intermediate inter-heating operations.

Further characteristics and advantages will be clearer from the detailed description of preferred but not exclusive embodiments of a plant and a process for energy storage in accordance with the present invention.

DESCRIPTION OF THE DRAWINGS

Such description will be set forth hereinbelow with reference to the enclosed drawings, provided only as a non-limiting example, in which:

FIGS. 9-12 illustrate respective embodiments of the plant of FIG. 1.

DETAILED DESCRIPTION

With reference to the enclosed figures, reference number 1 overall indicates a plant for energy storage according to the present invention. The plant 1 operates for example with a working fluid WF different from atmospheric air, e.g. carbon dioxide ($CO_2$). For example, the plant 1 operates with a working fluid WF which has the following chemical-physical properties: critical temperature comprised between 0° C. and 200° C., density at 25° C. comprised between 0.5 kg/m$^3$ and 10 kg/m$^3$. For example, the working fluid selected from the group comprising: carbon dioxide, mixtures of $CO_2$ and other substances, $SF_6$, $N_2O$ that are pure or in a mixture.

The plant 1 is configured for carrying out a closed cyclic thermodynamic transformation (CTT), first in one direction in a charge configuration/phase and then in an opposite direction in a discharge configuration/phase, wherein in the charge configuration the plant 1 accumulates heat and pressure and in the discharge configuration generates electrical and/or mechanical energy.

Figure 1:
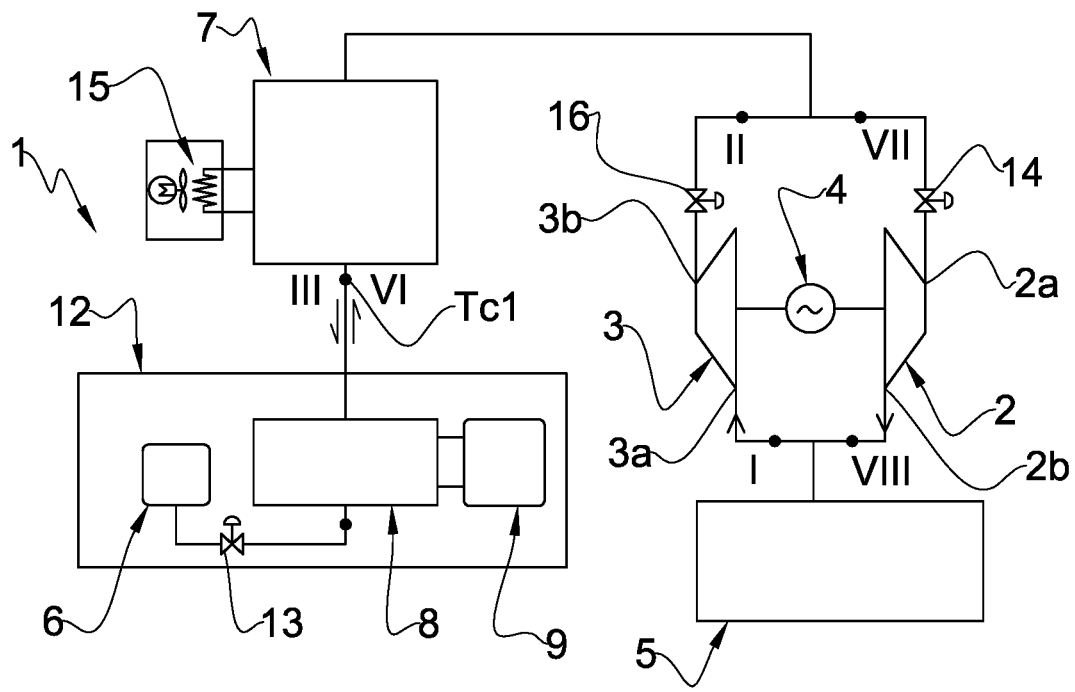
FIG. 1 schematically illustrates a plant for energy storage according to the present invention.

With reference to FIG. 1, the plant 1 comprises an expander defined by a turbine 2, configured for expanding the working fluid WF, and a compressor 3 of rotary type (turbocharger), configured to compress the working fluid WF.

The compressor 3 and the turbine 2 are connected to a same motor-generator 4 through respective non-illustrated transmissions, for example through connection devices of friction type, which allow connecting and disconnecting upon command the turbine 2 and/or the compressor 3 to/from the motor-generator 4.

The plant 1 comprises a casing 5 configured for storing the working fluid WF in gaseous phase and in pressure equilibrium with the atmosphere. The casing 5 is for example defined by a pressure-balloon made of flexible material, for example made of PVC coated polyester fabric. The pressure-balloon is preferably arranged on the surface and not in subterranean caverns and is externally in contact with the atmospheric air. At its interior, the pressure-balloon delimits a variable volume configured for containing the working fluid WF at atmospheric pressure or substantially atmospheric pressure, i.e. in pressure equilibrium with the atmosphere. The casing 5 can also be attained as a gasometer or any other storage system for gas at low or zero overpressure.

The plant 1 comprises a tank 6 configured for accumulating the working fluid WF in liquid or supercritical phase. The tank 6 is for example made of metal with an external wall of cylindrical or spherical shape.

The plant 1 comprises a thermal accumulator 7 (Thermal Energy Storage or TES) configured to transfer heat to the working fluid WF before it enters in the turbine 2 or to absorb heat from the working fluid WF exiting from the compressor 3. For example, the thermal accumulator 7 is a heat regenerator with fixed or movable bed or it comprises a water, oil or salt circuit with at least one storage chamber. The working fluid exchanges heat with a thermal mass (for example cement or ceramic or metal) of the heat regenerator of heat with fixed or movable bed or with water, oil or salt circuit.

A condenser/evaporator 8 is operatively coupled to the tank 6 and comprises a heat carrier VT (typically a fluid, e.g. water) configured to transfer heat to the working fluid WF or to absorb heat from the working fluid WF.

In the illustrated schematic embodiment, the condenser/evaporator 8 is placed between the thermal accumulator 7 and the tank 6. The condenser/evaporator 8 is connected to a basin 9 which contains the heat carrier VT.

Pipes for the working fluid WF, defined for example by a plurality of tubes, are operatively interposed between the casing 5 and the tank 6 and connect together, directly and/or indirectly, the casing 5, the tank 6, the compressor 3, the turbine 2, the thermal accumulator 7, the condenser/evaporator 8.

Figure 2A:
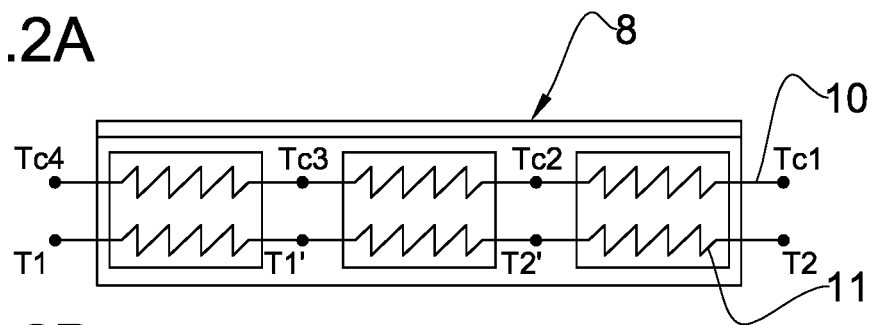
FIGS. 2A and 2B are schematic representations of an element of FIG. 1 in respective operative configurations.
Figure 2B:
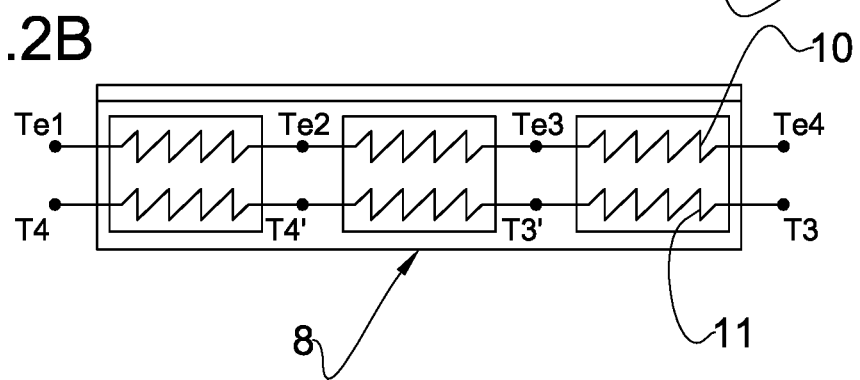

The condenser/evaporator 8 comprises one or more or is formed by one or more heat exchangers which allow exchanging heat between the working fluid WF which transits into the respective pipes and the heat carrier VT which flows into respective ducts connected to the basin 9. As schematically illustrated in FIGS. 2A and 2B, the working fluid passes through respective ducts 10 within the condenser/evaporator 8 and the heat carrier TV passes through respective ducts 11 within the condenser/evaporator 8.

The condenser/evaporator can be a unique exchanger or comprise a single plurality of exchangers in series or in parallel, capable of operating both condenser and as evaporator. Alternatively, the condenser/evaporator 8 comprises a condensation exchanger (or a single plurality of condensation exchangers in series or in parallel) and a different evaporation exchanger (or a single plurality of evaporation exchangers in series or in parallel).

For example, the condenser/evaporator 8 is of the type with tube bundle and shell (shell & tube), per se known and not illustrated herein. The heat carrier VT can be contained in the tubes of the tube bundle and the working fluid WF can be contained in the shell (i.e. between the shell and the tubes) or vice versa.

The system 12 which comprises the tank 6 with the working fluid WF contained therein, the condenser/evaporator 8, the basin 9 with the heat carrier TV is a system that is nearly adiabatic with the environment, i.e. it is a closed system that substantially does not exchange heat with the environment, except for thermal losses.

The pipes delimit a charge path extended from the casing 5 to the tank 6 and a discharge path extended from the tank 6 to the casing 5.

The plant 1 also comprises adjusting devices configured for actively adjusting parameters of the working fluid WF. The adjusting devices illustrated in FIG. 1 comprise a flow adjustment valve 13 operatively arranged between the tank 6 and the condenser/evaporator 8, an expander 2 inlet adjustment valve 14, an exchanger 15 of heat with the environment directly coupled to the thermal accumulator 7. The plant of FIG. 1 also comprises an interception valve 16 situated on a delivery of the compressor 3.

The plant 1 also comprises a control unit, not illustrated, operatively connected to the various elements of the plant 1 itself and configured/programmed for managing the operation thereof.

Figure 3:
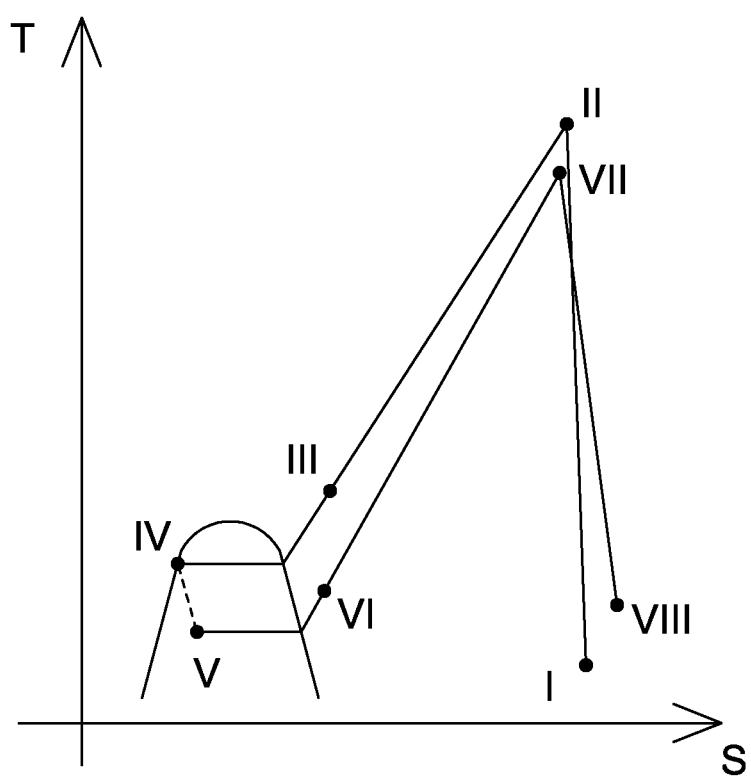
FIG. 3 is a T-S diagram relative to the thermodynamic transformation operated in the plant of FIG. 1.

The plant 1 is configured for operating in a charge configuration/phase or in a discharge configuration/phase, i.e. for executing a process comprising an energy charge phase and an energy generation and discharge phase according to a closed cyclic thermodynamic transformation CTT. In the charge configuration/phase, the plant 1 is configured to condense the working fluid WF by means of heat absorption by the heat carrier VT (and transfer of heat from the working fluid) and store said working fluid WF in the liquid or supercritical phase in the tank 6. In the discharge configuration/phase, the plant 1 is configured to evaporate the working fluid starting from the liquid or supercritical phase by transfer of heat from the heat carrier VT (and heat absorption by the working fluid). With reference to FIGS. 1 and 3, in the charge configuration/phase, the plant 1 starts from a first state in which the working fluid WF in gaseous form is contained in the casing 5 at atmospheric pressure or substantially atmospheric pressure and at a temperature substantially equal to the ambient temperature $T_{amb}$ (point I). The casing 5, through suitable valves, is placed in communication with an inlet 3a of the compressor 3 while the communication with an outlet 2b of the turbine 2 is blocked. In addition, due to valves, the thermal accumulator 7 is placed in fluid communication with an outlet 3b of the compressor 3 and the communication with an inlet 2a of the turbine 2 is blocked. The motor-generator 4 is coupled to the singe compressor 3 and is decoupled from the turbine 2 (which is at rest) and works as a motor for actuating the compressor 3 so as to compress the working fluid coming from the casing 5.

The working fluid WF is compressed in the compressor 3 and is heated (point II). A delivery temperature of the compressor 2 is for example at 400° C. The working fluid WF then flows through the thermal accumulator 7 which works as cooler in order to remove heat from the compressed working fluid WF, cool it (point III, FIGS. 3 and 3A) and accumulate the thermal energy removed from said working fluid WF. In point III, i.e. at the entrance into the condenser/evaporator 8, the working fluid WF is situated at a condenser inlet temperature Tc1 which is higher than the ambient temperature $T_{amb}$.

In the condenser/evaporator 8, which works in this phase as cooler/condenser, the working fluid WF transfers heat to the heat carrier TV, is subjected (FIG. 3A) to a desuperheating (from the condenser inlet temperature Tc1 to a condensation start temperature Tc2), followed by the condensation of the working fluid (from the condensation start temperature Tc2 to the condensation end temperature Tc3), followed by a supercooling (from the condensation end temperature Tc3 to a condenser outlet temperature Tc4), up to being situated in point IV. The working fluid WF is accumulated in supercooled liquid phase in the tank 6.

The heat carrier TV absorbs heat and is heated from a first heat absorption start temperature T1 to a second heat absorption end temperature T2. The temperature difference T2–T1 depends on the specific heat of the heat carrier TV, on the mass of the heat carrier TV and on the heat which it receives from the working fluid WF during condensation phase. When the working fluid WF is at the condenser inlet temperature Tc1, the heat carrier TV has the first heat absorption start temperature T1. When the working fluid WF is at the condenser outlet temperature Tc4, the heat carrier TV has the second heat absorption end temperature T2.

Figure 3A:
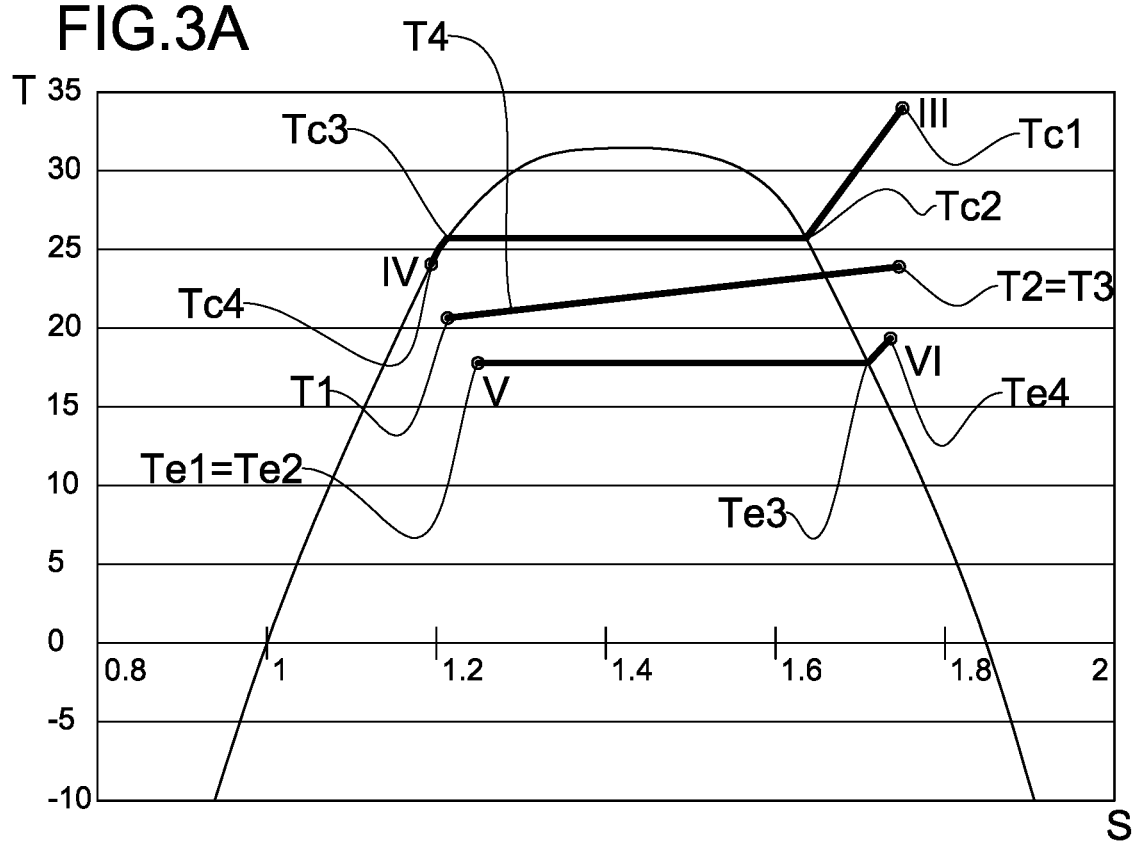
FIG. 3A is an enlargement of a part of the T-S diagram of FIG. 3.

According to that illustrated in the non-limiting example of FIGS. 3 and 3A, the condenser outlet temperature Tc4, i.e. the temperature at which the working fluid WF is accumulated in the tank 6, is higher than the ambient temperature $T_{amb}$. While it is accumulated, the working fluid exchanges heat with the environment due to thermal losses and is brought to point V at the temperature Te1 (FIG. 3A).

In the discharge configuration/phase, the plant 1 starts from this state (point V of FIG. 3A). The casing 5, through the valves, is placed in communication with the outlet 2*b* of the turbine 2 while the communication with the inlet 3*a* of the compressor 3 is blocked. In addition, by means of the valves, the thermal accumulator 7 is placed in fluid communication with the inlet 2*a* of the turbine 2 and the communication with the outlet 3*b* of the compressor 3 is blocked. The motor-generator 4 is coupled to the single turbine 2 and is decoupled from the compressor 3 (which is at rest) and works as a generator rotated by the turbine 2 actuated by the expanding working fluid.

The condenser/evaporator 8 works in this phase as heater/evaporator, the heat carrier TV transfers part of the heat, previously accumulated in the charge configuration, to the working fluid WF. The working fluid WF is subjected to a possible heating and/or throttling of the working fluid (from the evaporator inlet temperature Te1 to an evaporation start temperature Te2), followed by the evaporation of the working fluid (from the evaporation start temperature Te2 to an evaporation end temperature Te3), followed by a superheating of the working fluid (from the evaporation end temperature Te3 to a temperature at the end of the superheating/evaporator Te4 outlet), up to being situated at point VI.

The heat carrier TV transfers heat and is cooled by a third heat transfer start temperature T3 to a fourth heat transfer end temperature T4. The temperature difference T3–T4 depends on the specific heat of the heat carrier TV, on the mass of the heat carrier TV and on the heat that is removed therefrom by the working fluid WF during the evaporation phase.

When the working fluid WF is at the evaporator inlet temperature Te1, the heat carrier TV has the third heat transfer start temperature T3. When the working fluid WF is at the evaporator outlet temperature Te4, the heat carrier TV has the fourth heat transfer end temperature T4.

Figure 4:
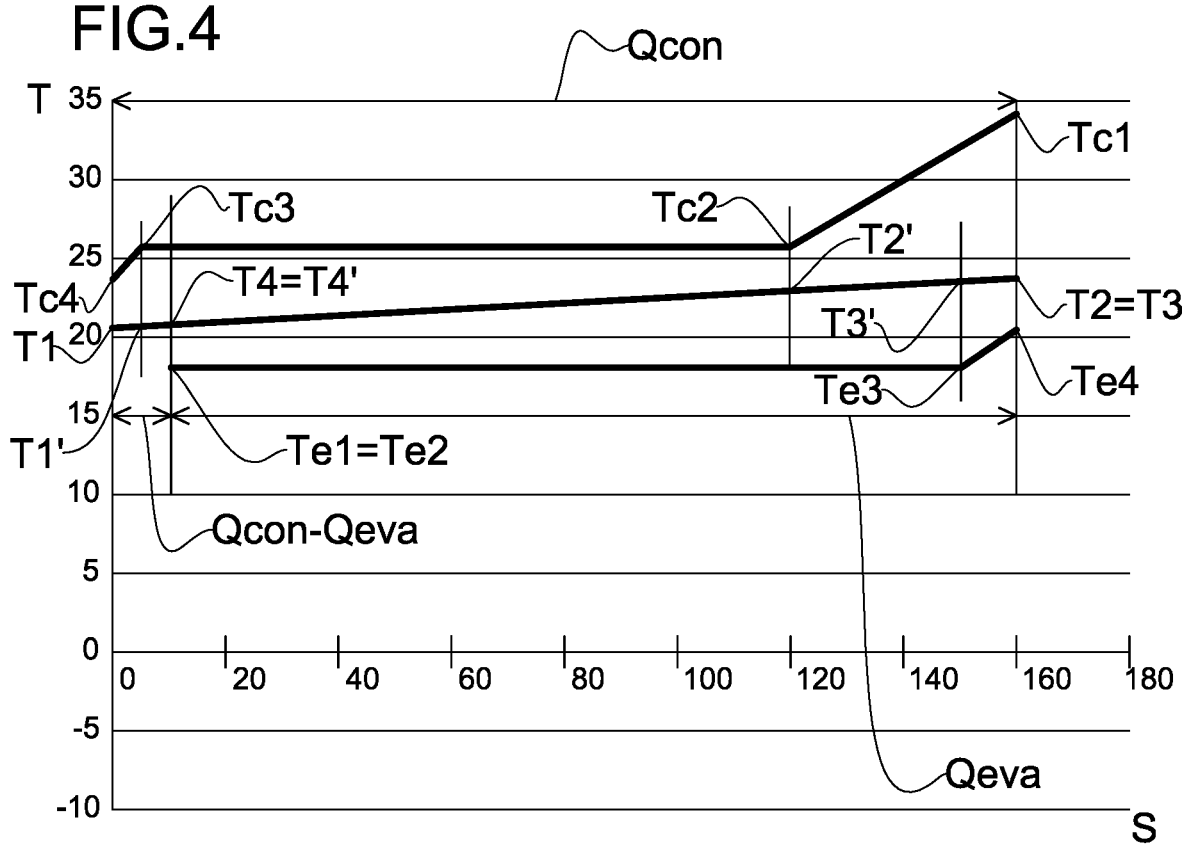
FIG. 4 is an enlargement of FIG. 3.

According to that illustrated in the non-limiting example of FIGS. 3, 3A and 4, the evaporator inlet temperature Te1 and the evaporation start temperature Te2 coincide and the second temperature T2 and the third temperature T3 of the heat carrier TV coincide so that the system does not significantly dissipate heat. In addition, in order to maximize the performance of the system, it is desirable to have the evaporation pressure Pe as high as possible. If follows that, during the evaporation phase, the heat of evaporation $Q_{evap}$ removed is smaller than the heat of condensation $Q_{cond}$ during the condensation phase and hence the temperature T4 will be higher than the temperature T1.

Once exited from the condenser/evaporator 8, the working fluid WF traverses the thermal accumulator 7 which now works as heater and transfers further heat, previously accumulated in the charge configuration, to the working fluid WF and it heats it. The heated working fluid WF enters into the turbine 2, is expanded and is cooled (point VIII of FIG. 3) and causes the rotation of the turbine 2. The turbine 2, rotated by the heated working fluid, drives the motor-generator 4 which works as generator and generates electrical energy. The working fluid WF exiting from the turbine 2 returns into the casing 5 at atmospheric pressure or substantially atmospheric pressure (point VII of FIG. 3).

Once one cycle has terminated, the plant 1—in order to prepare for a new cycle—must bring the heat carrier back to the first temperature T1, starting from the second temperature T2. There is thus the need to extract heat from the heat carrier TV and transfer it to the environment. The first temperature T1 must be close to or higher than the ambient temperature $T_{amb}$ so that the heat is transferred outside the system.

In accordance with the plant and the process of the present invention, provision is made for adjusting one or more parameters of the working fluid WF related to the condensation and/or to the evaporation, through the abovementioned adjusting devices, in order to control the temperature of the heat carrier TV and to uncouple said temperature of the heat carrier TV from the ambient temperature $T_{amb}$ without the aid of systems outside the cyclic thermodynamic transformation. In particular, the active adjustment of one or more parameters of the working fluid WF allows carrying out the cyclic thermodynamic transformation (CTT) independent of the ambient temperature $T_{amb}$ and without the aid of devices outside the cyclic thermodynamic transformation (CTT) adapted to create artificial sources at a temperature higher or lower than the ambient temperature $T_{amb}$. The system which contains the heat carrier TV, in an entirely natural manner, will transfer heat to the environment or will receive heat from the environment depending on whether it is at a temperature higher or lower than the ambient temperature $T_{amb}$.

Hence the present invention also relates to a method for controlling a heat carrier in the process and/or in the plant for energy storage.

The working fluid WF parameters that can be actively adjusted are the following: condenser inlet temperature Tc1 and/or condensation start temperature Tc2 and/or condensation end temperature Tc3 and/or condenser outlet temperature Tc4, evaporator inlet temperature Te1 and/or evaporation start temperature Te2 and/or evaporation end temperature Te3 and/or evaporator outlet temperature Te4 and/or evaporation pressure Pe.

Figure 5:
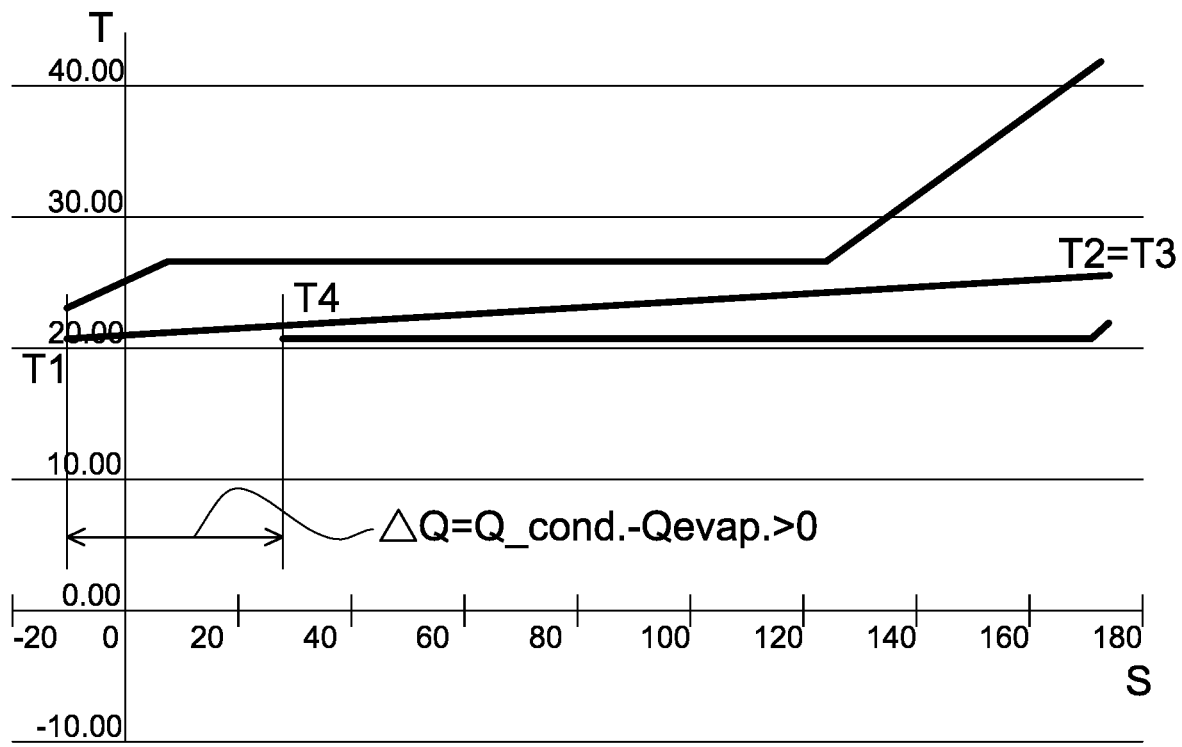
FIG. 5 illustrates the enlargement of FIG. 4 according to an operative mode.

Example 1—FIG. 5

If it is desired to have an excess of heat during the condensation phase with respect to the evaporation phase ($Q_{cond}-Q_{evap}>0$), the following adjustments can be executed.

During the condensation phase:
increasing the inlet temperature at the condenser Tc1, i.e. increasing a difference between the inlet temperature at the condenser Tc1 and the condensation start temperature Tc2 so as to increase the heat of the desuperheating sub-phase;
decreasing the outlet temperature of the condenser Tc4 and hence increasing a difference between condensation end temperature Tc3 and the condenser outlet temperature Tc4 so as to increase the heat to be removed during the supercooling sub-phase.

In this manner, with respect to that illustrated in FIG. 4, the second temperature T2 of the heat carrier TV increases, given the same condensation pressure Pe conditions, due to the higher quantity of heat to be removed.

During the evaporation phase:
increasing the evaporation pressure Pe (and hence the evaporator inlet temperature Te1 and/or the evaporation start temperature Te2 and/or the evaporation end temperature Te3) so as to reduce the heat of evaporation in the evaporation sub-phase;
decreasing a difference between the evaporation end temperature Te3 and the evaporator outlet temperature Te4 in order to reduce the superheating heat.

In this manner, with respect to that illustrated in FIG. 4, the fourth temperature T4 of the heat carrier TV increases, given the same conditions, due to the lower quantity of heat removed and due to the higher third temperature T3 of the heat carrier TV.

Figure 6:
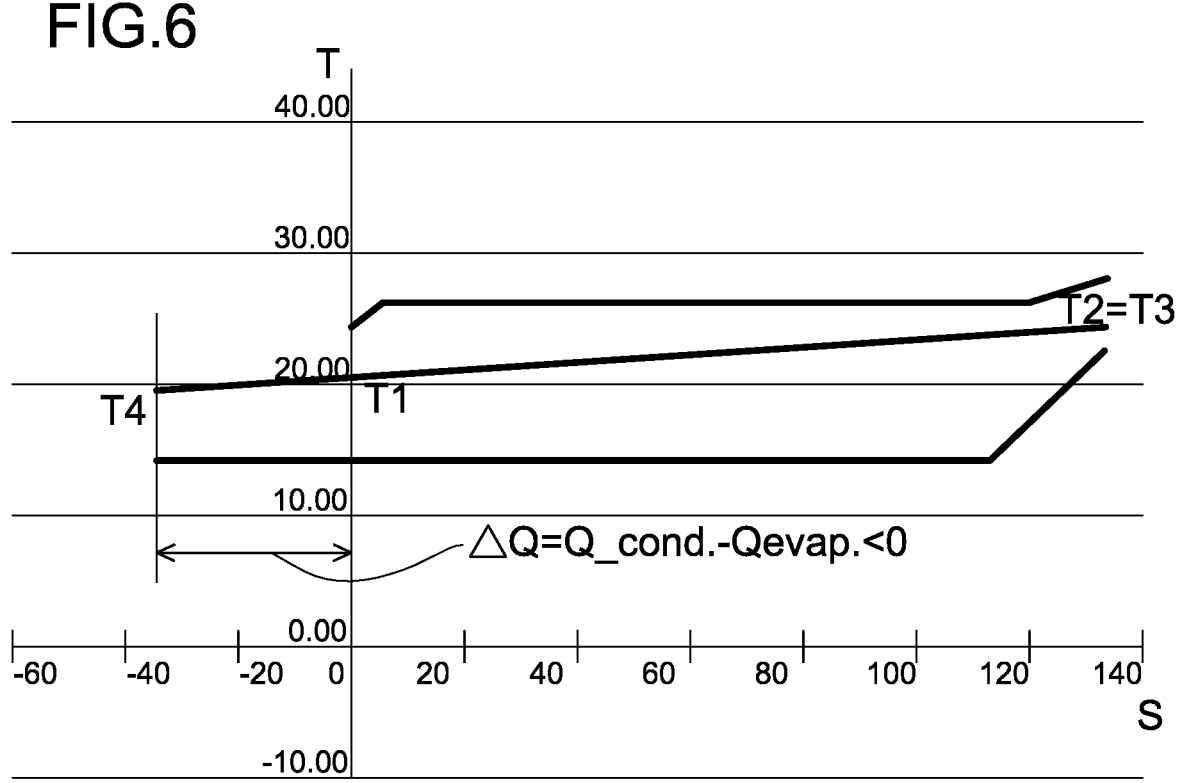
FIG. 6 illustrates the enlargement of FIG. 4 according to a different operative mode.

Example 2—FIG. 6

If it is desired to have an excess of heat during the evaporation phase with respect to the condensation phase ($Q_{cond}-Q_{evap}<0$), the following adjustments can be executed.

During the condensation phase:
decreasing the condenser inlet temperature Tc1 or decreasing a difference between the condenser inlet temperature Tc1 and the condensation start temperature Tc2, in order to reduce the heat of the desuperheating sub-phase;
increasing the condenser outlet temperature Tc4 or decreasing a difference between the condensation end temperature Tc3 and the condenser outlet temperature Tc4, in order to reduce the heat to be removed during the supercooling sub-phase.

In this manner, with respect to that illustrated in FIG. 4, the second temperature T2 of the heat carrier will be lower, given the same conditions, due to the lower quantity of heat to be removed.

During the evaporation phase:
decreasing the evaporation pressure Pe (and hence the evaporator inlet temperature Te1 and/or the evaporation start temperature Te2 and/or the evaporation end temperature Te3), in order to increase the heat of evaporation in the evaporation sub-phase since the latent heat increases with the decrease of the pressure (bell shape of FIG. 3A);
increasing a difference between the evaporation end temperature Te3 and the evaporator outlet temperature Te4, in order to increase the superheating heat.

In this manner, with respect to that illustrated in FIG. 4, the fourth temperature T4 of the heat carrier TV will be lower, given the same conditions, due to the higher quantity of heat removed and due to the lower third temperature T3 of the heat carrier TV.

The control unit is operatively coupled to the adjusting devices and is configured and/or programmed to adjust said one or more parameters of the working fluid. The evaporation pressure Pe of the working fluid WF (and hence the evaporator inlet temperature Te1 and/or the evaporation start temperature Te2 and/or the evaporation end temperature Te3) can be adjusted through the flow adjustment valve 13 and possibly also through the expander 2 inlet adjustment valve 14. By acting on the adjustment of the flow rate of the working fluid WF and with the adjustment of the expander 2 inlet adjustment valve 14, in accordance with the flow rate of the heat carrier fluid TV, it is possible to obtain the desired effect in various modes. For example, one mode is that in which the expander 2 inlet valve 14 adjusts the pressure upstream, i.e. at the evaporator 8. In this case, if the expander 2 inlet valve 14 is not completely open, the flow adjustment valve 13 for adjusting the flow acts in order to adjust the power and the expander 2 inlet valve 14 defines the evaporation pressure Pe. If the expander 2 inlet valve 14 is completely open, the evaporation pressure Pe is dependent on the flow that is adjusted by the flow adjustment valve 13.

The condenser outlet temperature Tc4 can be adjusted in various modes.

In one embodiment, the condenser/evaporator 8 comprises a supercooling exchanger specifically dedicated to cooling the working fluid WF from the condensation end temperature Tc3 to the condenser outlet temperature Tc4 (supercooling). In this case, the condenser outlet temperature Tc4 can be adjusted by adjusting a flow rate of the heat carrier TV in the supercooling exchanger. Such flow rate of the heat carrier TV can be adjusted between a maximum flow rate and a zero flow rate (with complete bypass of the supercooling exchanger). The maximum flow rate allows having the condenser outlet temperature Tc4 identical to or slightly higher than the first temperature T1 of the heat carrier TV and having the maximum removal of thermal heat. The zero flow rate allows having the condenser outlet temperature Tc4 equal to the condensation end temperature Tc3 and not having removal of thermal heat.

If the condenser/evaporator 8 is a single exchanger of the type with tube bundle and shell (shell & tube), with the heat carrier contained in the tubes of the tube bundle and the working fluid WF contained between the tubes and the shell, the condenser outlet temperature Tc4 is adjusted by adjusting a level of the working fluid WF in the shell (and/or by selecting how many tubes and hence how much surface of the exchanger to be dedicated to supercooling). Such level of the working fluid WF can be adjusted between a maximum level (design) and a minimum level below the tubes. The maximum level allows having the condenser outlet temperature Tc4 identical to or slightly higher than the first temperature T1 of the heat carrier TV and having the maximum removal of thermal heat, having a part of the tubes of the exchanger which exchange heat with the condensate and hence which supercool the condensate. The minimum level below the tubes allows having the condenser outlet temperature Tc4 equal to the condensation end temperature Tc3 and not having the removal of thermal heat. Indeed, in this case, not having any tube of the exchanger that exchanges heat with the condensate, one prevents removing heat from the condensate and the condensate is not supercooled.

If the condenser/evaporator 8 is a single exchanger of the type with tube bundle and shell (shell & tube), with the working fluid WF contained in the tubes of the tube bundle and the heat carrier TV contained between the tubes and the shell, the condenser outlet temperature Tc4 is adjusted by adjusting a flow rate of the heat carrier TV in the tubes (i.e. by increasing the heat exchange and hence the capacity of removing heat from the working fluid WF). In this case the heat carrier TV condenses within the tubes. Such flow rate of the heat carrier TV can be adjusted between a maximum flow rate (design) and a minimum flow rate. The maximum flow rate allows having the condenser outlet temperature Tc4 identical to or slightly higher than the first temperature T1 of the heat carrier TV and having the maximum removal of thermal heat. The minimum flow rate allows having the condenser outlet temperature Tc4 equal to or slightly lower than the condensation end temperature Tc3 and not having removal of thermal heat after condensation. The temperature at the end of superheating/evaporator Te4 outlet can be adjusted in various modes.

In one embodiment, the condenser/evaporator 8 comprises a superheating exchanger dedicated to superheating the working fluid WF from the evaporation end temperature Te3 to the evaporator outlet temperature Te4 (superheating). In this case, the evaporator outlet temperature Te4 can be adjusted by adjusting a flow rate of the heat carrier TV in the superheating exchanger. Such flow rate of the heat carrier TV can be adjusted between a maximum flow rate and a zero flow rate (with complete bypass of the superheating exchanger). The maximum flow rate allows having the evaporator outlet temperature Te4 identical to or slightly lower than the third temperature T3 of the heat carrier TV and having the maximum transfer of thermal heat. The zero flow rate allows having the evaporator outlet temperature Te4 equal to the evaporation end temperature Te3 and not having transfer of thermal heat.

If the condenser/evaporator 8 is a single exchanger of the type with tube bundle and shell (shell & tube), with the heat carrier contained in the tubes of the tube bundle and the working fluid WF contained between the tubes and the shell, the evaporator outlet temperature Te4 is adjusted by adjusting a level of the working fluid WF in the shell (and/or by selecting how many tubes and hence how much surface of the exchanger to be dedicated to superheating). Such level of the working fluid WF can be adjusted between a minimum level (design) and a maximum level above tubes. The minimum level allows having the evaporator outlet temperature Te4 identical to or slightly lower than the third temperature T3 of the heat carrier TV and having the maximum transfer of thermal heat, since a part of the tubes of the exchanger exchange heat with the vapor and hence overheat the vapor. The maximum level above the tubes allows having the evaporator outlet temperature Te4 equal to the evaporation end temperature Te3 and not having transfer of thermal heat. Indeed, in this case, not having any tube of the exchanger uncovered which exchanges heat with the vapor, one prevents superheating the vapor.

If the condenser/evaporator 8 is a single exchanger of the type with tube bundle and shell (shell & tube), with the working fluid WF contained in the tubes of the tube bundle and the heat carrier TV contained between the tubes and the shell, the evaporator outlet temperature Te4 is adjusted by adjusting a flow rate of the heat carrier TV in the tubes (i.e. by increasing the heat exchange and hence the capacity to transfer heat to the working fluid WF). In this case the working fluid WF evaporates and is overheated within the tubes. Such flow rate of the heat carrier TV can be adjusted between a maximum flow rate (design) and a minimum flow rate. The maximum flow rate (design) allows having the evaporator outlet temperature Te4 identical to or slightly lower than the third temperature T3 of the heat carrier TV and having the maximum transfer of thermal heat. The minimum flow rate allows having the evaporator outlet temperature Te4 identical to or slightly higher than the evaporation end temperature Te3 and not having transfer of thermal heat after evaporation.

The condenser inlet temperature Tc1 is adjusted through the exchanger 15 of heat with the environment coupled to the thermal accumulator 7. The exchanger 15 of heat with the environment provides for exchanging with the external environment part of the heat of the working fluid WF that is accumulated or transits in the thermal accumulator 7 in the charge configuration/phase.

The exchanger 15 of heat with the environment illustrated in FIG. 1 comprises a circuit with water and a radiator part of the circuit, provided with a fan. In embodiment variants, not illustrated in detail, the exchanger 15 can be of the type with direct exchange, in the sense that the working fluid WF passes into the tubes and transfers/takes heat directly from the air. As a function of where the circuit is positioned in the thermal accumulator 7, it is possible to remove heat from the thermal accumulator 7 and from the working fluid WF and transfer it to the environment or absorb heat from the environment and transfer it to the thermal accumulator 7 and to the working fluid WF. In this manner, the temperature downstream of the thermal accumulator 7, i.e. the condenser inlet temperature Tc1, can be adjusted.

In the plant illustrated in FIG. 1, the suction pressure of the compressor 3 is fixed and is nearly identical to the atmospheric pressure, except for the load losses. The delivery pressure instead is dependent on the condensation pressure plus the possible load losses. The delivery temperature of the compressor 3 is directly dependent on the delivery pressure and on the performance of the compressor 3 itself. The higher the delivery pressure, the higher the temperature; additionally, greater pressure jump implies a lower performance of the machine.

The delivery pressure, if it was in some way tied to the ambient temperature $T_{amb}$, would in some way be predefined/constrained by the climactic conditions where the system is installed. Through the above-described control of the condenser/evaporator 8, it is instead possible to define, independent of the environment conditions, the delivery pressure of the compressor 3.

This is an extremely advantageous characteristic, since the compressor 3 can:
  always work close to the design point; indeed, being uncoupled from the ambient temperature, variations due to the daily and seasonal change of temperature are not sustained, thus allowing working in the points of maximum performance of the compressor 3;
  limit the operating pressure, allowing the use of machines with main geometry of axial type;
  limit the maximum operating temperature; indeed in hot climates, the condensation pressure would be high and also the delivery temperature would increase, involving selection of "costly" materials both for the construction of the machine and for the thermal accumulator placed downstream of the compressor; by adjusting the pressure of the condenser it is instead possible to maintain a sufficiently low pressure and hence a reasonable temperature that allows a selection of common materials, typically lower than 450° C., preferably lower than 375° C. for the thermal accumulator but also for pipes, connections, valves and all that which lies downstream of the compressor, including the expander;

enable the condensation even in places where the climate is extremely unfavorable, such to have the ambient temperature higher than the critical temperature of the working fluid; without a control and a free selection of the condensation pressure, it would be impossible to attain the system where condensation is provided for;

have an additional variable for defining the power of absorption of the compressor; indeed, the power of the compressor depends on the pressure pump and on the processed flow rate; while on the flow rate it is possible to act on the variable geometries of the machines, though within a limited range, by acting on the delivery pressure of the machine the adjustable field ("power") increases considerably;

the possibility to maintain constant the delivery pressure, independent of the surrounding conditions, allows being able to select a more "rigid" but more efficient machine type;

the possibility to be able to select the delivery pressure allows the installation also at altitudes where the atmospheric pressure is lower, also because it would increase the pressure pump of the compressor.

Figure 7A:
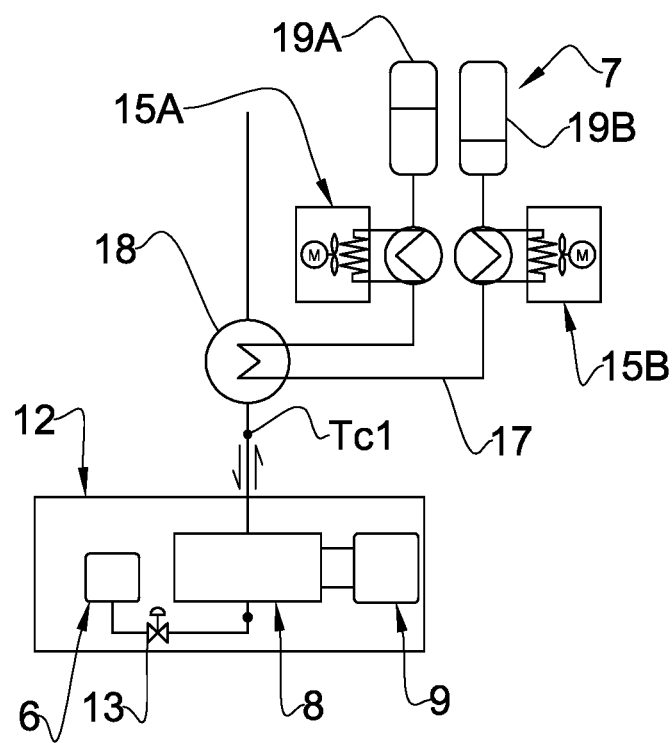
FIG. 7A illustrates a portion of the plant of FIG. 1 according to an embodiment variant.

FIG. 7A illustrates a portion of the plant 1 according to an embodiment in which the thermal accumulator 7 comprises a thermal fluid and an auxiliary exchanger 18, wherein the auxiliary exchanger 18 is operatively coupled to the pipes and is placed between the compressor 2 and the condenser/evaporator 8. The thermal accumulator 7 comprises a first tank 19A (hot storage of the thermal fluid), a second tank 19B (cold storage of the thermal fluid) connected together through as suitable piping 17. The auxiliary exchanger 18 is placed between the first tank 19A and the second tank 19B. The thermal fluid, for example water, is situated in the first tank 19A, in the second tank 19B to move through the auxiliary exchanger 18 coupled to the pipes with the working fluid WF. In addition, a first exchanger 15A of heat with the environment is situated between the first tank 19A and the auxiliary exchanger 18, a second exchanger 15B of heat with the environment situated between the second tank 19B and the auxiliary exchanger 18. The thermal accumulator 7 thus structured also allows adjusting the condenser inlet temperature Tc1.

Figure 7B:
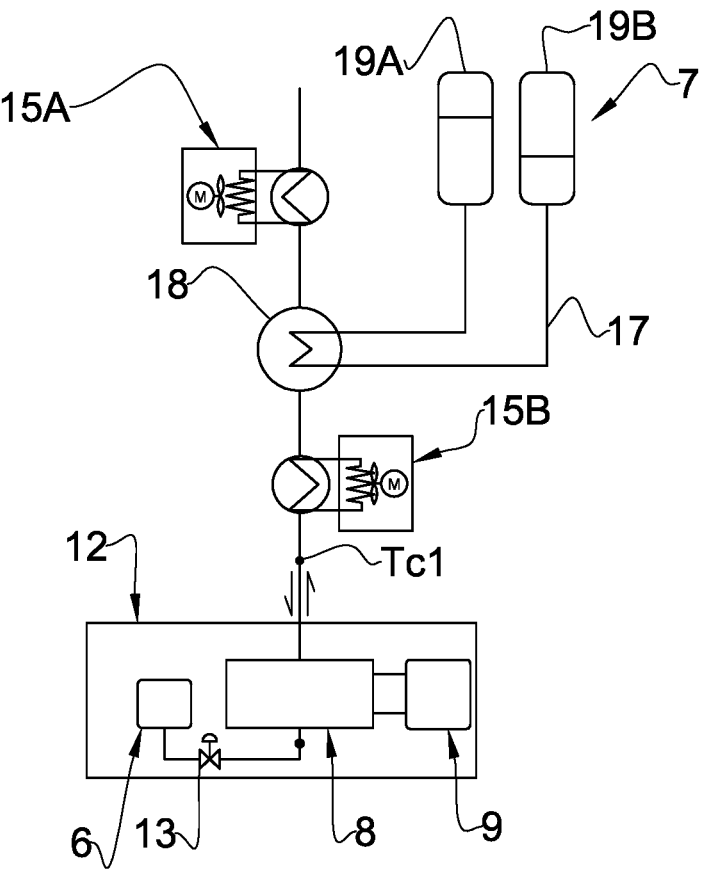
FIG. 7B illustrates a different variant of the portion of FIG. 7A.

FIG. 7B illustrates a portion of the plant 1 according to an embodiment in which the thermal accumulator 7 comprises a thermal fluid and an auxiliary exchanger 18, wherein the auxiliary exchanger 18 is operatively coupled to the pipes and is placed between the compressor 2 and the condenser/evaporator 8. The thermal accumulator 7 comprises a first tank 19A (hot storage of the thermal fluid), a second tank 19B (cold storage of the thermal fluid) connected together through a suitable piping 17. The auxiliary exchanger 18 is placed between the first tank 19A and the second tank 19B. The thermal fluid, for example water, is situated in the first tank 19A, in the second tank 19B to move through the auxiliary exchanger 18 coupled to the pipes with the working fluid WF. In addition, a first exchanger 15A of heat with the environment is situated between that which lies upstream of the exchanger 18 and the auxiliary exchanger 18, a second exchanger 15B of heat with the environment situated between the auxiliary exchanger 18 and the condenser evaporator. The exchangers 15A and 15B directly exchange heat with the WF and the environment without intermediate heat carriers. The thermal accumulator 7 thus structured also allows adjusting the condenser inlet temperature Tc1.

Figure 8:
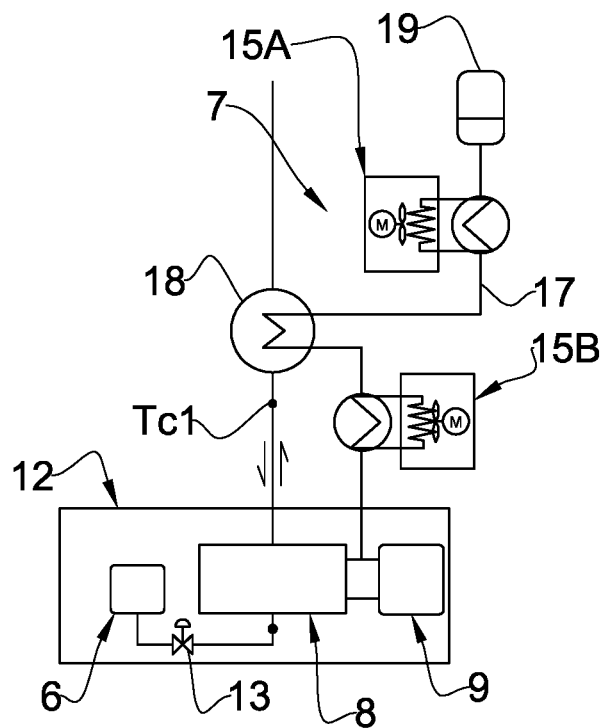
FIG. 8 illustrates the portion of FIG. 7A according to a further embodiment variant.

FIG. 8 illustrates a variant of the thermal accumulator 7 of FIG. 7A, in which the thermal fluid is the same heat carrier TV used in the condenser/evaporator 8. The thermal accumulator 7 of FIG. 8 comprises a tank 19 (hot storage of the thermal fluid) for the thermal heat carrier/fluid TV in fluid communication with the basin 9 (cold storage of the thermal fluid) of the heat carrier TV. The first exchanger 15A of heat with the environment is situated between the tank 19 and the auxiliary exchanger 18, the second exchanger 15B of heat with the environment is situated between the auxiliary exchanger 18 and the basin 9. One part of the heat carrier exiting from the condenser/evaporator 8 (at the second temperature T2) is picked up in the charge configuration/phase and stored in the tank 19 after having absorbed heat from the working fluid WF through the auxiliary exchanger 18. In the discharge configuration/phase, such part of the heat carrier is given back at the inlet to the condenser/evaporator 8 after having transferred heat to the working fluid WF through the auxiliary exchanger 18.

In the solutions illustrated above in FIGS. 7A and 8, it is possible to adjust the condenser inlet temperature Tc1 by acting on the thermal accumulator 7, exporting heat from or transferring heat to the environment through the first and the second exchanger 15A, 15B of heat with the environment. If one wishes to extract heat, it will be necessary to act on the phase in which the heat carrier/fluid of the thermal accumulator 7 has a temperature higher than the ambient temperature, while instead it will be possible to insert heat in the system on the phase in which the heat carrier/fluid is at a temperature lower than the ambient temperature. The first exchanger 15A transfers heat to the environment by removing it from the working fluid WF (TC1 decreases). The second exchanger 15B transfers heat to the working fluid WF by removing it from the environment (TC1 increases).

In the case of direct exchange (FIG. 7B), if one wishes to extract heat, it will be necessary to act on the phase in which the WF has a temperature higher than the ambient temperature, while instead it will be possible to insert heat in the system on the phase in which the WF is at a temperature lower than the ambient temperature.

Figure 9:
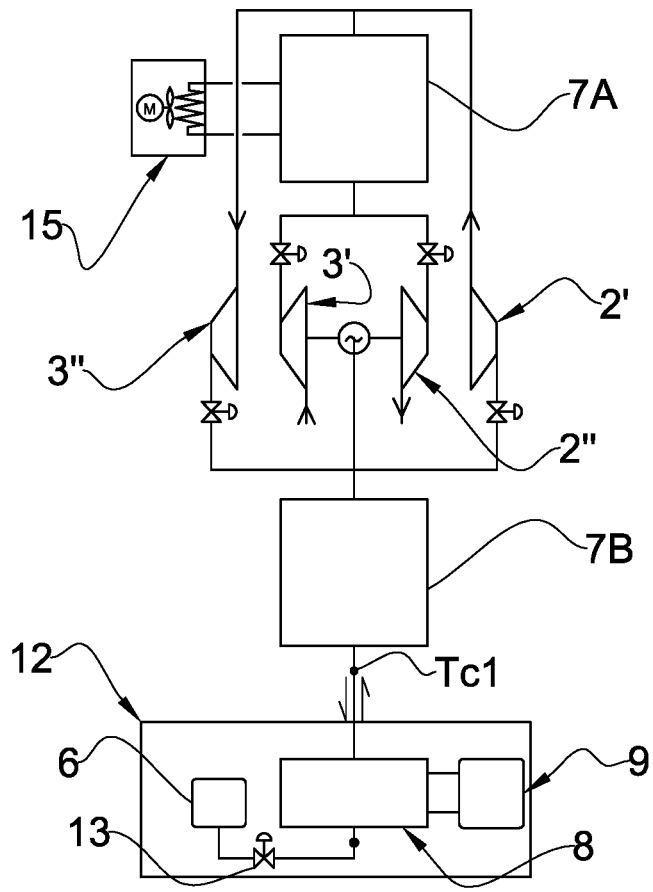

FIG. 9 illustrates an embodiment of the plant 1 that comprises two compressors 3', 3" placed in series and two expanders 2', 2" placed in series. The thermal accumulator comprises a first thermal accumulator 7A that lies interposed between the two compressors 3', 3" and the two expanders 2', 2", so that the compressors 3', 3" are inter-cooled and the expanders 2', 2" are inter-heated. A second thermal accumulator 7B is situated as in FIG. 1. The exchanger 15 of heat with the environment is directly coupled to the first thermal accumulator 7A and not to the second thermal accumulator 7B.

Figure 10:
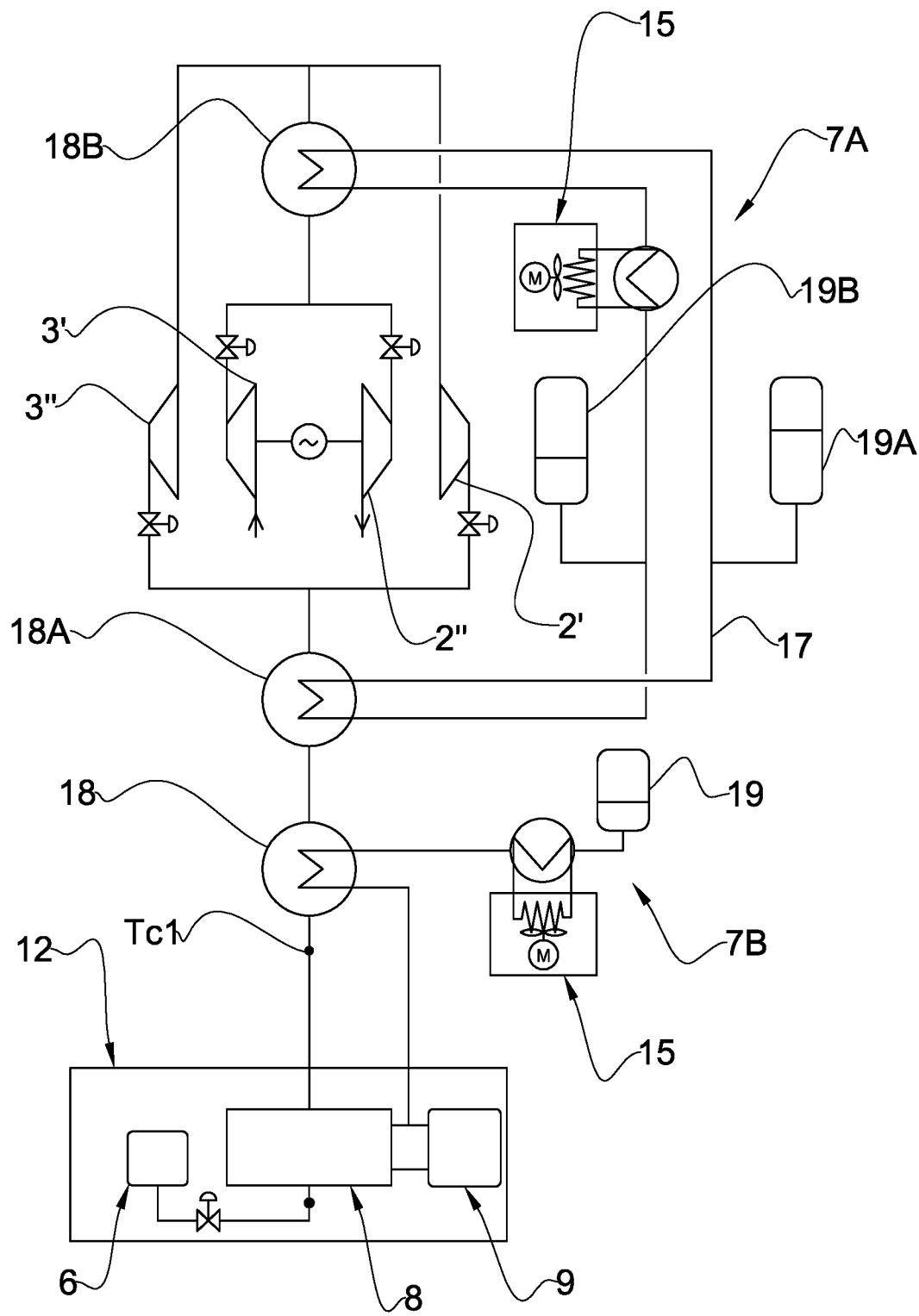

FIG. 10 illustrates a variant of the embodiment of the plant 1 of FIG. 9 (with two compressors 3', 3" placed in series and two expanders 2', 2" placed in series, a first thermal accumulator 7A and a second thermal accumulator 7B).

The first thermal accumulator 7A is divided into two parts and comprises a first tank 19A (hot storage of the thermal fluid), a second tank 19B (cold storage of the thermal fluid) connected together and to a first and to a second auxiliary exchanger 18A, 18B through a suitable piping 17. The first heat exchanger 18A is coupled to the pipes of the working fluid WF downstream of the two compressors 3', 3" placed in series (in the charge phase) and upstream of the two expanders 2', 2" placed in series (in the discharge phase). The second heat exchanger 18B is interposed between the two compressors 3', 3" (in the charge phase) and between the two expanders 2', 2" (in the discharge phase). The heat exchanger 15 with the environment is coupled to the piping 17.

The second thermal accumulator 7B comprises a tank 19 for the thermal heat carrier/fluid TV in fluid communication with the basin 9 of the heat carrier TV. A single exchanger 15 of heat with the environment is situated between the tank 19 and the auxiliary exchanger 18. The auxiliary exchanger 18 is coupled to the pipes of the working fluid WF between the condenser/evaporator 8 and the first heat exchanger 18A.

FIG. 11 illustrates a further variant of the embodiment of the plant 1 of FIG. 9 (with two compressors 3', 3" placed in series and two expanders 2', 2" placed in series, a first thermal accumulator 7A and a second thermal accumulator 7B). The first thermal accumulator 7A is of "pressurized packed bed" (PPB) type and an exchanger 15 of heat with the environment is coupled to the pipes of the working fluid WF between said first thermal accumulator 7A and the compressor 3" placed more downstream.

The second thermal accumulator 7B comprises a first tank 19A (hot storage of the thermal fluid), a second tank 19B (cold storage of the thermal fluid) connected together through a suitable piping 17. The auxiliary exchanger 18 is placed between the first tank 19A and the second tank 19B. In this exemplifying embodiment, the second thermal accumulator 7B is not provided with an exchanger 15 of heat with the environment.

FIG. 12 illustrates a variant of the embodiment of the plant 1 of FIG. 11 which differs from FIG. 11 due to the fact that the second thermal accumulator 7B is substantially identical to that illustrated in FIG. 10.

The invention claimed is:

1. A method for controlling a heat carrier in a process for energy storage, wherein
    the process comprises carrying out a closed cyclic thermodynamic transformation, first in one direction in a charge configuration/phase and then in an opposite direction in a discharge configuration/phase, between a casing for the storage of a working fluid different from atmospheric air, in a gaseous phase and in pressure equilibrium with the atmosphere, and a tank for the storage of said working fluid in a liquid or supercritical phase;
    in the charge phase the process accumulates heat and potential energy in the form of pressure and in the discharge phase generates energy;
    in the charge phase, a condensation of the working fluid is executed by means of heat absorption by the heat carrier, executed in a condenser/evaporator which works as a cooler/condenser, in order to store said working fluid in the liquid or supercritical phase;
    in the discharge phase, an evaporation of the working fluid, in said condenser/evaporator which works as a heater/evaporator, is performed starting from the liquid or supercritical phase and by transfer of heat from the heat carrier;
    the method comprises actively adjusting at least one parameter of the working fluid related to the condensation and/or to the evaporation, in order to control at least one temperature of the heat carrier and to uncouple said at least one temperature of the heat carrier from an ambient temperature; and
    said at least one parameter of the working fluid is selected from a group comprising:
    a condenser inlet temperature;
    a condensation start temperature;
    a condensation end temperature;
    a condenser outlet temperature;
    an evaporator inlet temperature;
    an evaporation start temperature;
    an evaporation end temperature; and
    an evaporator outlet temperature.

2. A process for energy storage, comprising:
    carrying out a closed cyclic thermodynamic transformation, first in one direction in a charge configuration/phase and then in an opposite direction in a discharge configuration/phase, between a casing for the storage of a working fluid different from atmospheric air, in a gaseous phase and in pressure equilibrium with the atmosphere, and a tank for the storage of said working fluid in a liquid or supercritical phase; wherein, in the charge phase, the process accumulates heat and potential energy in the form of pressure and in the discharge phase generates energy, wherein
    in the charge phase, condensation of the working fluid is carried out by absorption of heat by a heat carrier, executed in a condenser/evaporator which works as a cooler/condenser, in order to store said working fluid in the liquid or supercritical phase;
    in the discharge phase, evaporation of the working fluid, executed in said condenser/evaporator which works as a heater/evaporator, is performed starting from the liquid or supercritical phase and by transfer of heat from the heat carrier;
    at least one parameter of the working fluid related to condensation and/or evaporation is actively adjusted in order to control at least one temperature of the heat carrier and to uncouple said at least one temperature of the heat carrier from an ambient temperature; and
    said at least one parameter of the working fluid is selected from a group comprising:
    a condenser inlet temperature;
    a condensation start temperature;
    a condensation end temperature;
    a condenser outlet temperature;
    an evaporator inlet temperature;
    an evaporation start temperature;
    an evaporation end temperature; and
    an evaporator outlet temperature.

3. The process according to claim 2, wherein
    said at least one parameter of the working fluid is an evaporation pressure; and
    the adjustment of said evaporation pressure affects the evaporator inlet temperature and/or the evaporation start temperature and/or the evaporation end temperature.

4. The process according to claim 3, wherein
    the heat carrier has: a first temperature of starting heat absorption; a second temperature of ending heat absorption; a third temperature of starting heat transfer; and a fourth temperature of ending heat transfer; and
    said at least one temperature of the heat carrier to be controlled comprises the first temperature and/or the fourth temperature of the heat carrier.

5. The process according to claim 4, further comprising controlling the first temperature and/or the fourth temperature of the heat carrier so that the fourth temperature is higher than the first temperature, to have an excess of heat during condensation compared to evaporation, so that the heat carrier can release heat to the environment while the working fluid is stored.

6. The process according to claim 5, wherein controlling the first temperature of the heat carrier to have said excess of heat during condensation compared to evaporation comprises:
when condensing,
increasing the condenser inlet temperature or increasing a difference between the condenser inlet temperature and the condensation start temperature; and/or
decreasing the condenser outlet temperature or increasing a difference between the condensation end temperature and the condenser outlet temperature; and/or
when evaporating,
increasing the evaporation pressure and then the evaporator inlet temperature and/or the evaporation start temperature and/or the end evaporator temperature; and/or
decreasing a difference between the evaporation end temperature and the evaporator outlet temperature.

7. The process according to claim 4, further comprising controlling the first temperature and/or the fourth temperature of the heat carrier so that the first temperature is higher than the fourth temperature, to have an excess of heat during evaporation compared to condensation, so that the heat carrier can absorb heat from the environment while the working fluid is stored.

8. The process according to claim 7, wherein controlling the first temperature of the heat carrier to have said excess of heat during evaporation compared to condensation comprises:
when condensing,
decreasing the condenser inlet temperature or decreasing a difference between the condenser inlet temperature and the condensation start temperature; and/or
increasing the condenser outlet temperature or decreasing a difference between the condensation end temperature and the condenser outlet temperature; and/or
when evaporating,
decreasing the evaporation pressure and then the evaporator inlet temperature and/or the evaporation start temperature and/or the evaporation end temperature; and/or
increasing a difference between the evaporation end temperature and the evaporator outlet temperature.

9. A plant for energy storage, comprising:
a working fluid other than atmospheric air;
at least one casing configured to store the working fluid in a gaseous phase and in pressure equilibrium with the atmosphere;
at least one tank configured to store said working fluid in a liquid or super-critical phase;
pipes operatively interposed between the casing and the tank and connecting, directly and/or indirectly, the casing with the tank, the pipes delimiting:
at least one charge path extended from the casing to the tank, and
at least one discharge path extended from the tank to the casing;
at least one expander arranged along the pipes and configured to expand the working fluid;
at least one compressor placed along the pipes and configured to compress the working fluid; and
at least one condenser/evaporator placed along the pipes, operatively coupled to the tank and comprising a heat carrier configured to transfer heat to the working fluid or to absorb heat from the working fluid, wherein
the plant is configured to carry out a closed cyclic thermodynamic transformation with the working fluid, first in one direction in a charge configuration and then in an opposite direction in a discharge configuration, between said casing and said tank;
in the charge configuration, the plant is configured to condense the working fluid through heat absorption by the heat carrier, executed in the condenser/evaporator which works as a cooler/condenser, and to store said working fluid in the liquid or super-critical phase;
in the discharge configuration, the plant is configured to evaporate the working fluid starting from the liquid or super-critical phase through transfer of heat from the heat carrier, executed in said condenser/evaporator which works as a heater/evaporator;
the plant comprises adjusting devices and a control unit operatively coupled to the adjusting devices;
the control unit is configured and/or programmed to actively adjust at least one parameter of the working fluid related to condensation and/or evaporation through said adjusting devices, in order to control at least one temperature of the heat carrier and to uncouple said at least one temperature of the heat carrier from an ambient temperature; and
said at least one parameter of the working fluid is selected from a group comprising:
a condenser inlet temperature;
a condensation start temperature;
a condensation end temperature;
a condenser outlet temperature;
an evaporator inlet temperature;
an evaporation start temperature;
an evaporation end temperature; and
an evaporator outlet temperature.

10. The plant according to claim 9, wherein the adjusting devices comprise: a flow control valve operatively arranged between the tank and the condenser/evaporator and configured to adjust an evaporation pressure of the working fluid and then the evaporator inlet temperature and/or the evaporation start temperature and/or the evaporation end temperature.

11. The plant according to claim 10, wherein the adjusting devices comprise: a control valve placed at the inlet of the expander and configured to adjust the working fluid evaporation pressure and then the evaporator inlet temperature and/or the evaporation start temperature and/or the evaporation end temperature.

12. The plant according to claim 9, wherein
the adjusting devices comprise: at least one heat exchanger configured to exchange heat with the environment and directly or indirectly coupled to the pipes, located upstream of the condenser/evaporator and downstream of the compressor along the charge path; and
said at least one heat exchanger configured to exchange heat with the environment is configured to adjust the condenser inlet temperature.

13. The plant according to claim 12, further comprising a thermal accumulator operatively coupled to the pipes and placed between the expander and the condenser/evaporator, wherein the adjusting devices are operatively coupled to the thermal accumulator or are operatively active between the thermal accumulator and the condenser/evaporator.

14. The plant according to claim 13, wherein
the thermal accumulator comprises: a thermal fluid and an auxiliary exchanger;
the auxiliary exchanger is operatively coupled to the pipes and is placed upstream of the condenser/evaporator along the charge path; and
said at least one heat exchanger configured to exchange heat with the environment is operatively coupled to the thermal accumulator.

15. The plant according to claim 9, wherein
the adjusting devices comprise: a flow rate and/or level regulator of the heat carrier and/or of the working fluid operatively active in the condenser/evaporator when working as a condenser; and
the flow rate and/or level regulator is configured to adjust said flow rate or said level of the heat carrier and/or of the working fluid and therefore the condenser outlet temperature.

16. The plant according to claim 9, wherein
the adjusting devices comprise: a flow rate and/or level regulator of the heat carrier and/or of the working fluid operatively active in the condenser/evaporator when working as an evaporator; and
the flow rate and/or level regulator is configured to adjust said flow rate or said level of the heat carrier and/or of the working fluid and therefore the evaporator outlet temperature.

* * * * *